INVENTOR.
CHARLES B. SAWYER

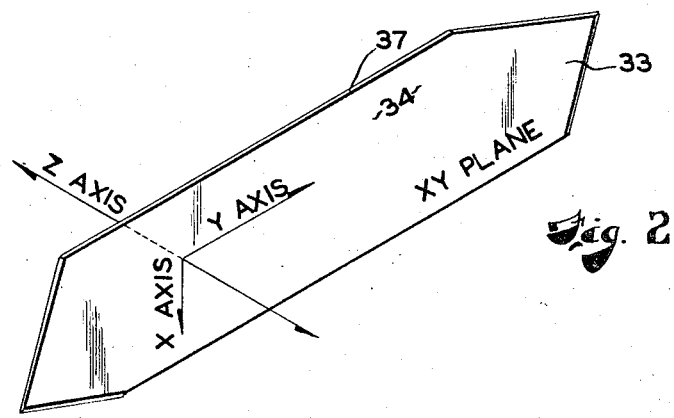
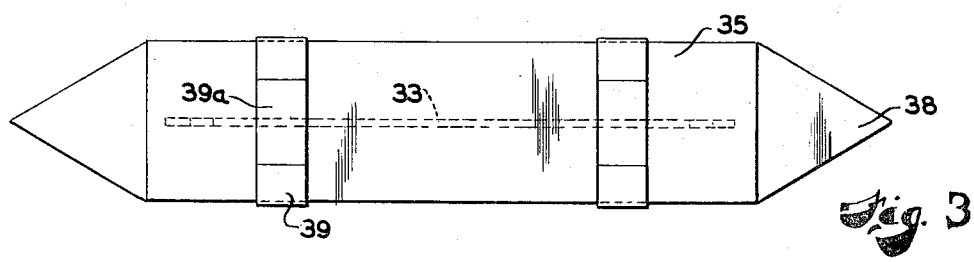
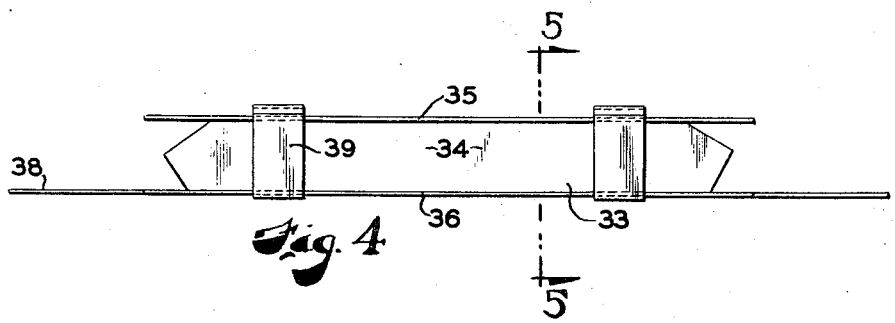
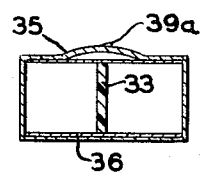

INVENTOR.
CHARLES B. SAWYER

Dec. 13, 1966 C. B. SAWYER 3,291,575
METHOD FOR GROWTH OF PEGMATITIC QUARTZ CRYSTALS IN
A CONTROLLED AXIAL DIRECTION
Filed Jan. 27, 1965 5 Sheets-Sheet 4
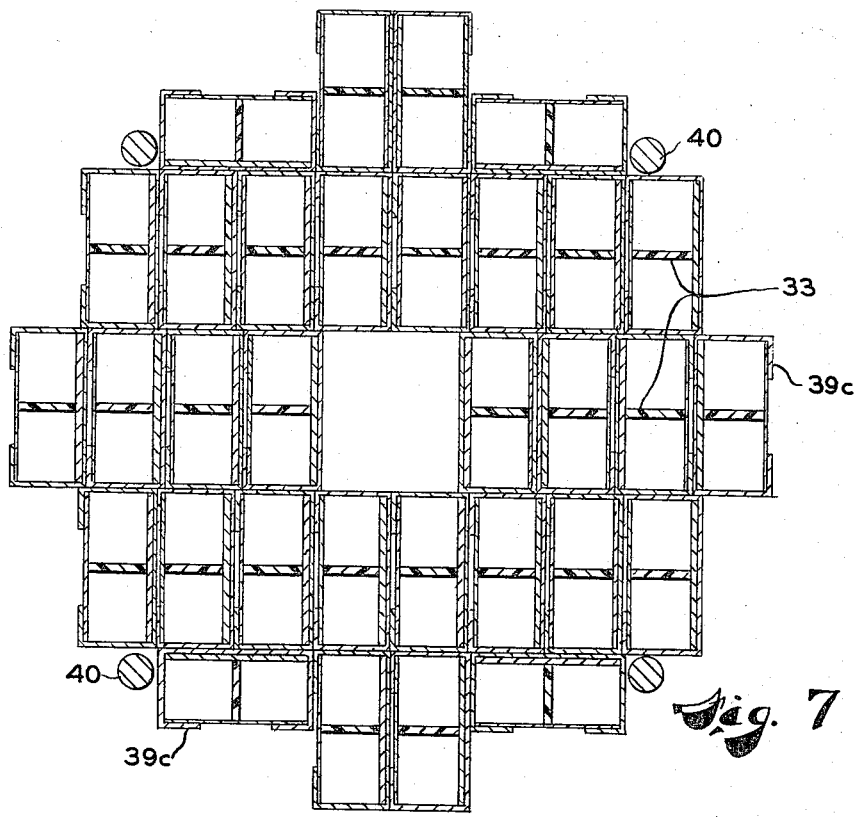
Fig. 7
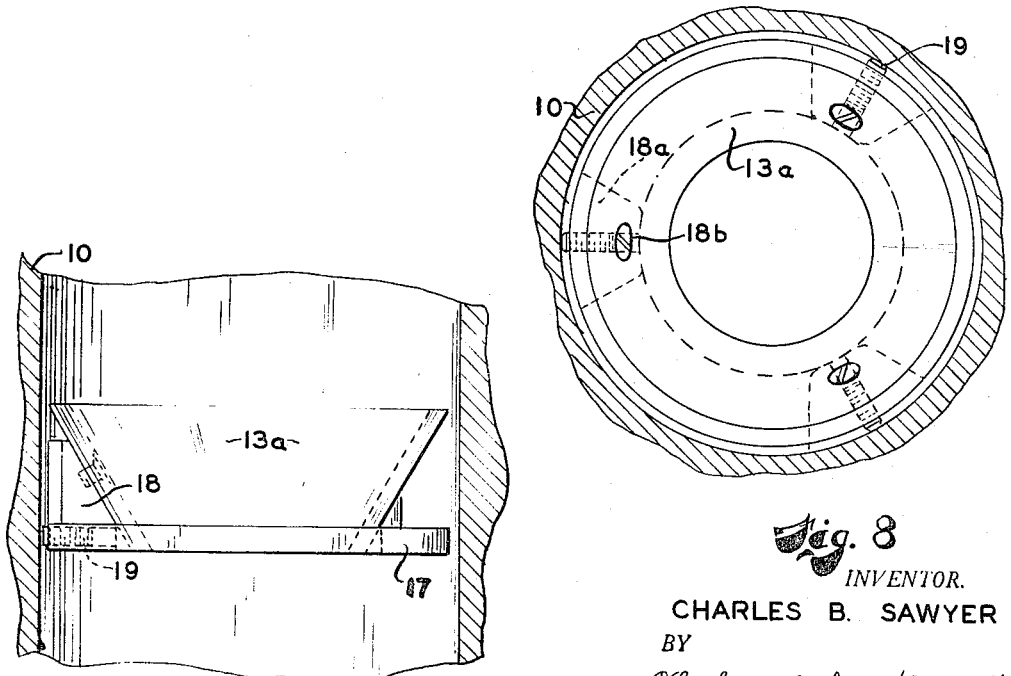
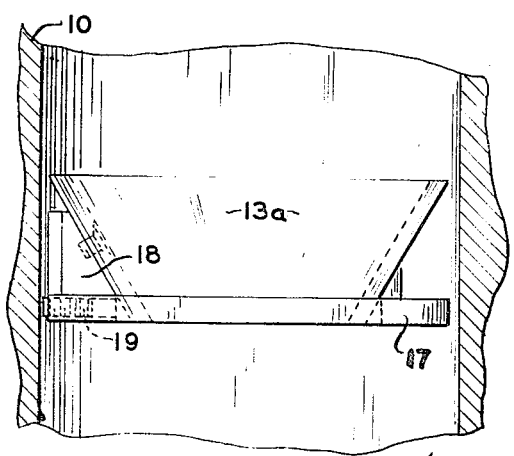
Fig. 8
Fig. 9
INVENTOR.
CHARLES B. SAWYER
BY
Oberlin, Maky, & Donnelly
ATTORNEYS Dec. 13, 1966  C. B. SAWYER  3,291,575
METHOD FOR GROWTH OF PEGMATITIC QUARTZ CRYSTALS IN
A CONTROLLED AXIAL DIRECTION
Filed Jan. 27, 1965  5 Sheets-Sheet 5

INVENTOR.
CHARLES B. SAWYER
BY
Oberlin, Maky & Donnelly
ATTORNEYS

United States Patent Office 3,291,575
Patented Dec. 13, 1966

3,291,575
METHOD FOR GROWTH OF PEGMATITIC QUARTZ CRYSTALS IN A CONTROLLED AXIAL DIRECTION
Charles B. Sawyer, deceased, late of Cleveland Heights, Ohio, by The Cleveland Trust Company, executor, Cleveland, Ohio, assignor to Sawyer Research Products, Inc., Eastlake, Ohio, a corporation of Ohio
Filed Jan. 27, 1965, Ser. No. 429,951
9 Claims. (Cl. 23—301)

This application is a continuation-in-part of my prior co-pending application Serial No. 783,819, filed December 30, 1958, now abandoned.

The present invention relates to the production of artificial crystals, and more particularly to a method and apparatus for promoting crystal growth in a predetermined direction.

The present method and apparatus are adapted for artificially producing various crystals, usually oxides, such as beryllium oxide and aluminum oxide. However, the invention is particularly adapted for the production of pegmatitic crystals, notably quartz crystals, and therefore for convenience of disclosure will be described in connection with such crystals.

In the usual manner of artificially growing quartz crystals, a seed crystal is bathed in a nutrient solution either by mechanically induced means and/or by thermally induced means. The nutrient solution may comprise an aqueous alkaline solution of a siliceous material, such as fused silica, and nurtures the growth of the seed by gradual deposition of the siliceous material on the seed crystal.

The methods and apparatus previously developed to grow artificial quartz crystals in accordance with this general technique suffer from many shortcomings, among which the following may be included. In the science of crystallography, the axes of a crystal are normally designated the X, Y, and Z axes, each axis being angularly related to each of the other two axes. For example, a naturally occurring quartz crystal is elongated and has a generally hexagonal cross-section with pyramidal ends of six facets each. The Z axis of the naturally occurring quartz crystal extends longitudinally thereof, while there are three X and three Y axes perpendicular to the Z axis. The X axes intersect the angles formed by the sides of the crystal, while the Y axes are perpendicular to such sides. Experience has shown that a quartz crystal having its major growth in the direction of the Z axis is much to be preferred for commercial applications because, for reasons not fully understood, there is then a minimum of inclusion of impurities in such a crystal.

Some seed crystals used heretofore have not been adapted to take advantage of the preferred growth in the direction of the Z axis. For example, one seed crystal that is often used is the so-called "Y-bar" seed crystal. This seed consists substantially of a bar or pencil-shaped crystal of which the greatest length is in the direction of the Y axis. The X and Z axes are substantially the same length as each other and are disposed transversely of the Y-bar. Not only does such a seed crystal lack a control favoring the preferred growth in the direction of the Z axis, but as such a seed crystal grows radially of the Y axis in all directions, there is an ever increasing lateral area of the growing crystal on which deposition may take place. In a normal run using Y-bar seeds, the grown crystals may end with about five times as much "growing" surface as at the start of the run. This is objectionable since it tends to promote non-uniform growth and makes control of the growing conditions much more difficult, especially in the production of an optical grade of quartz. Thus, should one crystal of a family of crystals within an autoclave inadvertently gain in growth over the others, such excessive growth is not only perpetuated but accumulated to an increasing extent. Further, since a crystal-growing operation must be stopped as soon as one crystal reaches an allowable maximum size (in order to prevent one crystal from growing into or with another), non-uniform growth or a faster growth on one or more seed crystals causes the ultimate sizes of the remaining crystals in the batch to be below expectations.

Still another objection to Y-bar seeds, that is seeds long in the Y axis and having shorter Z and X axes of substantially the same length as each other, is that there is no accurate manner of checking the growth of a family of such seeds in the direction of the X axis, since the seeds are secluded within a high pressure autoclave. Ordinarily, a family of seeds may be planted for subsequent bathing in a nutrient solution in fairly even rows, the "alley" between the rows being designed for growth in the direction of the Z axis. The decreasing with of the "alley" as determined by gamma ray photographs indicates the increasing size of the growing crystals. However, it is not feasible to gamma ray photograph the seeds in a 90 degree direction from such "alleys" (which would now be at right angles to the X axis growth), since it is economically necessary so to pack the seeds that "alleys" are not formed in this direction. Accordingly, gamma ray photographs under such circumstances are at best only a qualitative test, because growth in the direction of the X axis remains an unknown quantity and may be of such an extent as to weld a growing crystal with adjacent growing crystals.

A still further objection to prior art techniques of artificially growing crystals concerns the seed holders employed. It has been thought necessary to grip the seeds quite firmly. As a result, grooves, slots, protuberances, indentations, bulges, and the like have been formed in such holders by which the seeds are held. As the seed grows, the protuberances, bulges, etc., grow into or otherwise become embedded within the accumulative crystal growth. Similarly, the portions of a seed crystal buried within grooves, slots, etc., are not exposed to a nutrient solution and therefore cannot grow. Accordingly, a crystal grown with such prior holders have sections in which portions of the holders are embedded, and these must be machined away; or portions of the seed crystal are not grown at all. In either case, the extent to which the seed holders are embedded within the grown crystal or the crystal area is not nurtured represents a loss of ultimate crystal yield.

Additionally, the usual manner of disposing seed holders within an autoclave while still permitting a satisfactory circulation of a nutrient solution therearound has not led to an economical use of the capacity of an autoclave. Often the seeds are cut or arranged for growth longitudinally of the autoclave as shown in Patent No. 2,785,058 to Buehler. However, growth in this direction may lead to the adherence of spurious seeds on the sloping faces of the ends of the crystal, thus endangering the normal desired growth.

The present invention avoids the foregoing difficulties. In accordance with the instant method and apparatus, a seed crystal is used which has its greatest length in the direction of the Y axis and which has a thickness in the direction of the X axis which exceeds the thickness in the direction of the Z axis. This seed structure results in a plane surface on the crystal that is disposed substantially perpendicularly to the Z axis or substantially parallel to a plane defined by the X and Y axes. Since this plane surface and its companion plane surface on the opposite side of the crystal are of the greatest area of those surfaces on the crystal, these plane surfaces outstrip the others in growth, so as to avoid the problems indicated, and moreover promote the preferred growth in the direction of the Z axis.

The criteria of the invention are met as long as the thickness of the present seed crystal in the direction of the X axis substantially exceeds the thickness in the direction of the Z axis. Preferably, the ratio of the length of the X axis to the length of the Z axis is sufficiently high to provide a seed crystal which is virtually of sheet form and in which the surfaces of largest area are cut perpendicularly to the Z axis as above defined, the length of the X axis being desirably at least five times that of the Z axis.

In addition, the seed crystal of the present invention is held between plates of a seed holder which engage the opposite edges or minor surfaces of the seed, so that any crystal growth that takes place must necessarily be primarily in the direction of the Z axis, thus producing the desired "pure Z" growth. Moreover, since only the sides or major faces of the sheet of said crystal primarily are exposed to the nutrient solution, the area so exposed is always substantially the same and therefore uniform for each seed crystal contained in a batch or family of seed crystals. Accordingly, in this form of the invention, there is substantially a constrained uniform growth of crystals, and one seed crystal again cannot so lead the others in growth in the direction of the X axis as to interfere with other crystals and cause an early shut-down of an autoclave.

Since the plates of the seed holder engage the seed only on its edges or at right angles to the X axis, it is important to note that growth along the X axis is thereby effectively prevented. In this manner, gamma ray photographs can be used in a manner previously described as a means of determining crystal growth quantitatively, since there is no need to consider what the growth in the direction of the X axis might be.

In addition, the plates of the present seed holder which face the seed are provided with smooth surfaces so that there can be no indenting or embedding of portions of the holders in a crystal as it grows. Therefore, there are no wasted sections in the final grown crystal.

Finally, the seed holders and racks therefor are so arranged in an autoclave in accordance with the present invention that growth takes place transversely of the autoclave for a more complete utilization of the capacity of such autoclave.

It is therefore a principal object of the present invention to provide a method and apparatus for promoting crystal growth in a predetermined direction.

Another object is to provide a method and apparatus for growing pegmatitic crystals substantially entirely along any one or two axes.

A further object is to provide a method and apparatus for growing pegmatitic crystals at a substantially uniform rate within a family or batch of such crystals.

A still further object is to provide a quartz seed crystal having its greatest length in the direction of the Y axis and a thickness in the direction of the X axis which substantially exceeds the thickness in the direction of the Z axis to provide a growing plane surface of greatest area perpendicular to the Z axis.

A still further object is to provide a method and apparatus for growing quartz crystals whose size can be accurately and quantitatively determined by gamma ray photographs.

A still further object is to provide seed holders which do not embed or indent portions thereof within the accumulative growth of a seed crystal.

A still further object is to provide a method and apparatus for growing quartz crystals transversely of a substantially vertical autoclave.

Other objects will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In said annexed drawing:

FIG. 2 is a perspective view of a sheet seed crystal of the present invention and illustrates the relation of the X, Y, and Z axes with respect thereto;

FIGS. 3 and 4 are plane and side elevational views, respectively, of a holder containing the seed crystal of FIG. 2;

FIG. 5 is a section of FIG. 4 on the line 5—5;

FIG. 7 is a horizontal section of the rack of FIG. 6 when completely loaded with seed holders and before any crystal growth has taken place;

FIG. 8 is a fragmentary section of FIG. 1 on the line 8—8 and shows a baffle plate which may be used in the autoclave;

FIG. 9 is a diametric section of FIG. 8;

Figure 1:
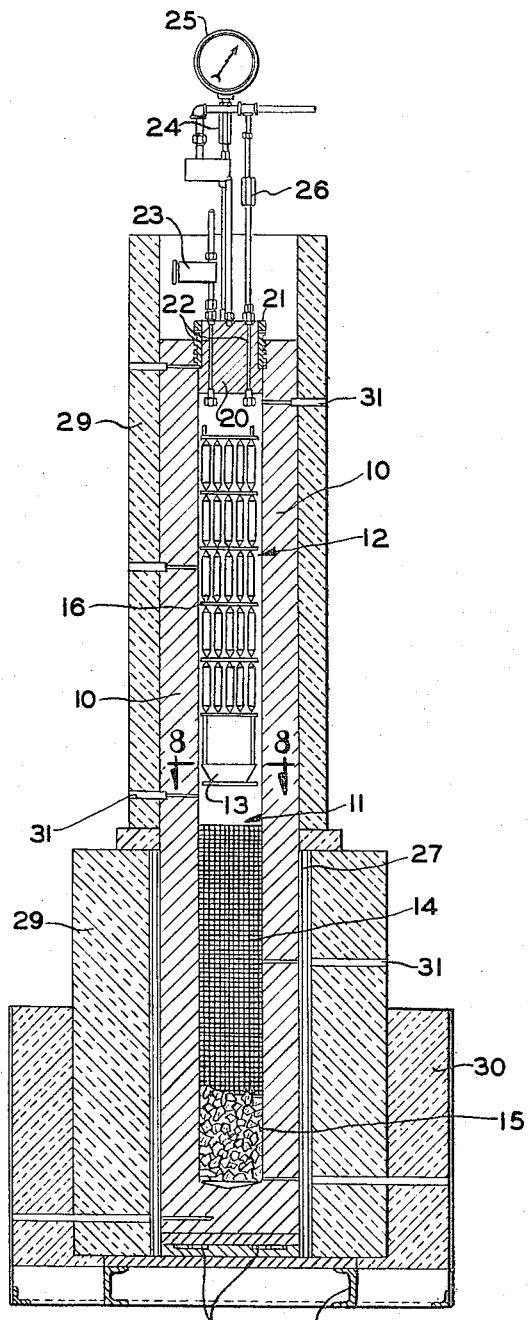
FIG. 1 is a vertical section of an autoclave embodying the present invention and shows a full complement of grown crystals.

Referring to the drawing and particularly to FIG. 1 thereof, an autoclave in which the present apparatus and method may be used includes a vertical tubular chamber 10 divided into a mineral-dissolving region generally indicated at 11 and a seed-growing region generally represented at 12 by a baffle cone or plate 13 located centrally of the chamber 10. This chamber may be fabricated from steel of high creep strength, such as steel containing 2.25 percent chromium and 1 percent molybdenum.

Within the mineral-dissolving region 11 lies a wire mesh feed basket 14 containing crystalline quartz 15 which is to be dissolved to form a nutrient solution and to be carried to the seed-growing region 12. A rack 16 supporting a plurality of seed crystals is stationed in the latter region. The baffle 13 (FIGS. 8 and 9) includes an inverted truncated cone 13a disposed in a ring 17. Three support members 18, fixed to the ring 17 at 120° from each other, have flange portions 18a which overlie the exterior of the cone section 13a and are secured thereto by set screws 18b. Additional set screws 19 radially pass through the ring 17 and bear against the inside wall of the chamber 10 to hold the assembly in position. The baffle plate 13 controls the exchange of the nutrient solution between the two regions, 11 and 12.

A plug 20 tightly seals the upper end of the chamber 10 and has a wear-resistant collar 21 fixed to the plug 20 and threadably meshing with a threaded upper terminus of the chamber. Narrow passages 22 extend through the plug 20 to expose suitable equipment to conditions extant within the interior of the chamber 10. Such equipment may include, for example, a bleeder valve 23, a surge check valve 24, a pressure gauge 25, a rupture disk 26, and other desired testing and control equipment.

Side and bottom strip heaters 27 and 28, respectively, are conventionally secured to the lower portion or mineral-dissolving region 11 of the chamber. These strip heaters are electrically energized as through potentiometer-type controllers operating in conjunction with a variable type transformer. Suitable high temperature insulation 29 encompasses the length of the chamber 10 and may comprise, for instance, magnesium oxide block insulation. Additional insulation 30 such as expanded mica (Vermiculite) embraces the lower end in order economically to effect in combination with the strip heaters 27 and 28 a higher temperature at the end of the chamber 10 and thereby induce thermal currents in the nutrient solution which travel upwardly and longitudinally of the chamber toward the seed-growing region 12. A series of thermocouple wells 31 spaced vertically along the autoclave penetrate to desired areas of the chamber and receive thermocouples to indicate the temperatures at such areas in a known manner. Standard beams or channels 32 support the entire autoclave structure.

Considering now in greater detail the seed-growing region 12 and the apparatus therefor, FIGS. 2 through 7 illustrate a quartz seed, seed holder, and rack which may be used in practicing the invention. It will be appreciated that any seed crystal of quartz, which has its greatest length in the direction of the Y axis and a thickness in the direction of the X axis which is greater than the thickness in the direction of the Z axis, will provide advantages of the present invention, because a growing plane surface of greatest area is provided perpendicularly to the Z axis and therefore greatest growth in the direction of the Z axis must take place as the seed crystal is exposed to a nutrient solution. In short, the volume of crystal growth in a seed crystal of the present invention in the direction of the Z axis is always greater than the volume of crystal growth in the direction of the X axis because of the defined dimensions of the original seed crystal. In order fully to take advantage of this concept in practice, a seed crystal is used having such a high X axis to a Z axis ratio, for example 5:1 to 8:1, that the seed acquires a sheet form as illustrated in FIG. 2. However, the advantages of the invention may be realized when such ratio is as low as 2:1. It is desirable to have the length of the Z axis as small as possible, preferably no larger than 0.1 inch. Z plates, that is, sheet crystals such as the one illustrated in FIG. 2, as thin as 0.06 inch and as wide as may be needed have been used. It is possible to use Z plates as small as 0.04 inch in thickness.

A preferred seed for use in accordance with this invention has a minimum length of 4.5 inches on the Y axis (see FIGS. 10–13), a minimum thickness of .050 inch and a maximum thickness of .14 inch on the Z axis, and a minimum width of ½ inch on the X axis. As will be seen, this affords a sheet seed suitable for employment as described above.

In particular, the X and Y axes of a seed crystal 33 lie on a plane formed by this plane surface of greatest area, here represented as a major surface 34, which in FIG. 2 has also been indicated as the XY plane. The Z axis, disposed at right angles to the X and Y axes, extends at right angles to the major surface 34 or XY plane and accordingly the accumulative growth of the seed crystal will be in the preferred direction along the Z axis, and if permitted to a much less extent along the Y axis. It is possible for the major surface 34 of a seed to depart from a true XY plane as just defined by as much as 10° and still obtain substantially pure Z growth from such a seed. It is not feasible to go beyond a 10° deviation from a cut truly perpendicular to the Z axis because of the uneconomical shape of end faces of the crystal bar. However, in some instances it is desirable to cut the major surface 34 at a slight angle to the ZY plane in order to compensate for obliquity of natural crystal faces produced.

Furthermore, when the crystal produced is to be used for making the well-known AT cuts, the best yields of high quality are obtainable when such crystal is grown from a sheet seed having a major face intersecting the crystallographic Z axis at an angle of 90° ±3°. The AT cut is diagrammatically illustrated in FIGS. 10 and 11, and these quartz crystal bars should be free of electrical and optical twinning. When examined in an oil bath under intense illumination, the degree of usability using natural quartz criteria should be at least 80%. The bar axis should desirably be within 1° of the Y axis. Such crystals are also suitable for the making of BT and CT cuts.

Figure 12:
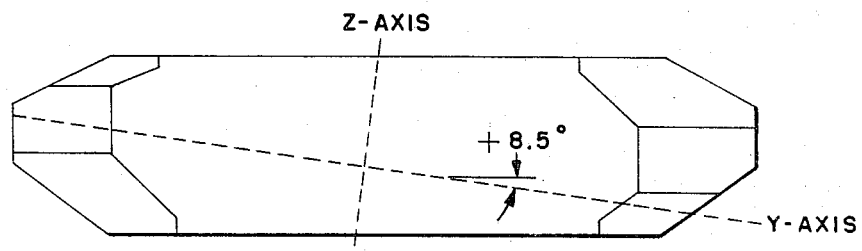
FIG. 12 is a top plan view of a cultured quartz crystal particularly suitable for utilization in the production of NT cuts.
Figures 13, 14:
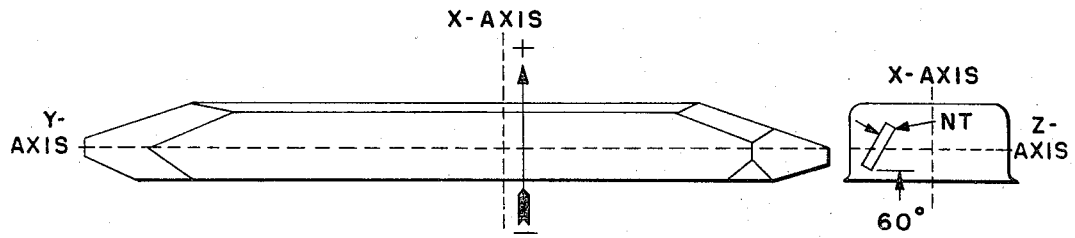
FIG. 13 is a side elevation of the crystal bar of FIG. 12.
FIG. 14 is a diagrammatic cross-section of the crystal bar of FIG. 13 indicating the manner in which NT cuts are taken therefrom.

It is when cultured quartz crystal bars are to be employed in the making of NT cuts, however, that the unexpected benefits of the present invention are most dramatically obtained, such cut being diagrammatically illustrated in FIGS. 12–14. NT cuts are, of course, well known and may be briefly defined as a cut made from a crystal which has been oriented by rotation through an angle of +8.5° about its X axis with a second rotation of + or −60° about the resulting Y+8.5° axis. Such bars should be free of electrical and optical twinning, and when examined in an oil bath under intense illumination the degree of usability using natural quartz criteria should be at least 80%. The bar axis should preferably be within 1° of the Y+8.5° axis. The best yields of NT cuts of high quality are obtainable when such crystal is grown from a sheet seed having a major face intersecting the crystallographic Z axis at an angle of 94°±6°, with 98½° being preferred for this purpose, and 98½°±1½° being very superior. The yield of NT cuts obtainable from a crystal grown from such preferred seed is approximately 50% greater than that obtainable from a crystal grown from an otherwise similar seed having its major face intersecting the crystallographic Z axis at an angle of 103°, for example. A principal reason for this remarkable advantage resides in the reduction of areas or regions including impurities (portions not composed substantially entirely of silica) so that a larger proportion of the crystal bar is usable for the intended purpose. In other words, it is important to grow the crystal to a physical shape or form which will be suitable for the maximum number of *usable* NT cuts, and the degree of inclusion of objectionable impurities is directly affected by the orientation of the crystallographic axes of the sheet seed from which the crystal is produced. There is a tendency for both sodium and aluminum to be included in certain regions of quartz crystals, depending on the manner of growth of such crystals, and these impurities, if at all extensive, are objectionable when a quartz disc or wafer cut from the crystal is to be used for various purposes, as in an oscillator, for example.

The seed holder (FIGS. 3–5) comprises a pair of substantially parallel plates 35 and 36 adapted frictionally to engage the opposing minor surfaces 37 of the seed crystal 33 to prevent growth in the direction of the X axis while permitting unrestricted growth of the seed in the direction of the preferred Z axis. One of the plates 35 or 36 extends past each end of the seed crystal 33 and terminates in a narrower portion transversely of the plate which in the embodiment shown is a pointed triangular end 38. This structure facilitates mounting the seed holders in a seed rack as hereinafter described. The plates 35 and 36 may be made of iron or low carbon alloys of iron, although other materials such as silver, titanium, and even graphite have been used.

Tension means secure the plates 35 and 36 in relation to the seed crystal 33 and may take the form of one or more extensible metal bands 39 which snugly embrace the exterior of the plates 35 and 36 to clamp them in a desired frictional engagement with the minor faces 37 or edges of the seed crystal 33. In order to impart a resilient tension to the assembled seed holder, one or more of the bands 39 may be offset as at 39a so that the band is somewhat stretched in tension upon being fitted about the plates and crystal.

It is emphasized that the surfaces of the plates 35 and 36 which face the seed crystal 33 are completely smooth to permit unrestricted growth of the seed in the direction of the Z axis. Further, it will be noted that by this structure there can be no embedding or identing portions of the plates in the accumulative growth of the seed 33.

Figure 6:
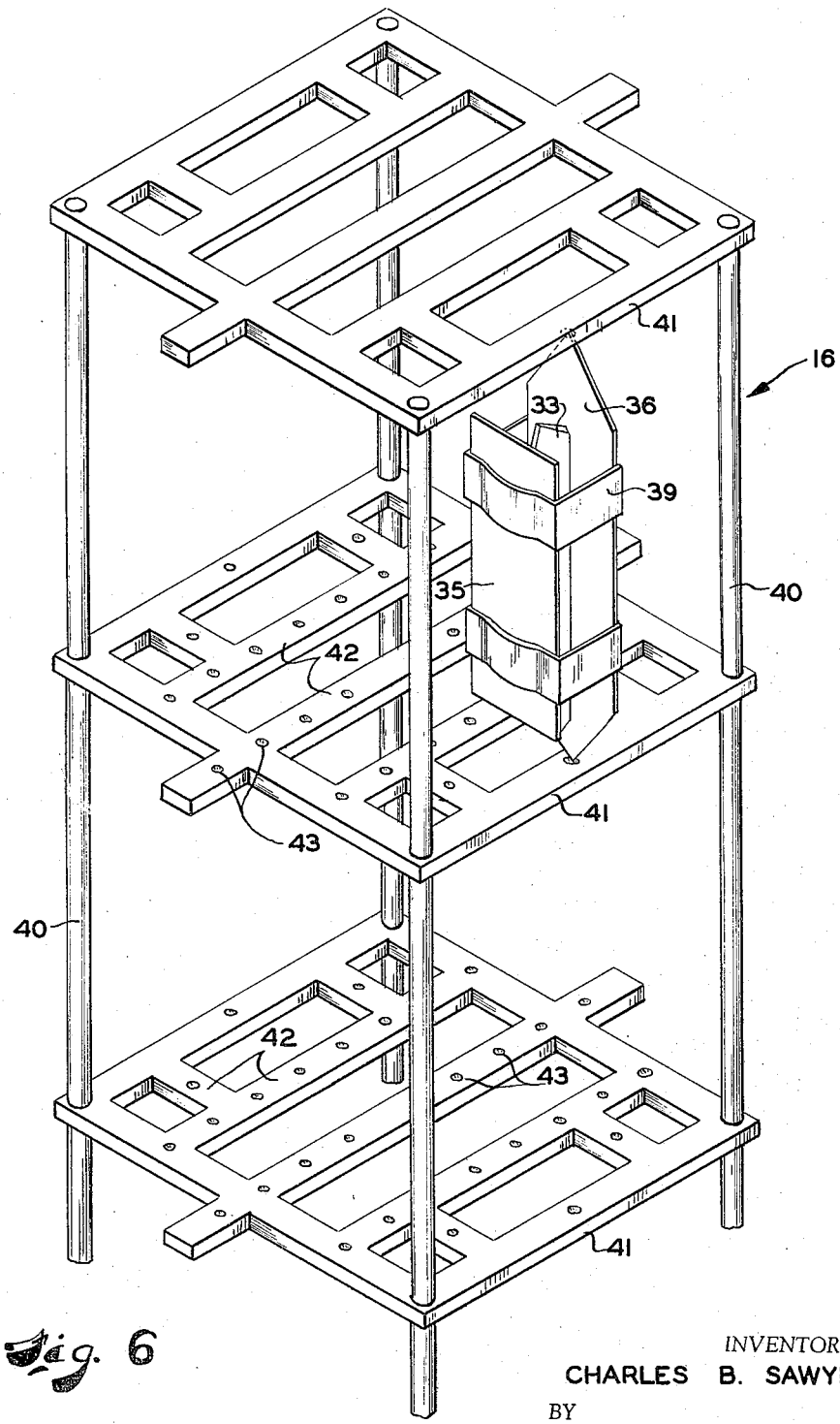
FIG. 6 is an isometric view of a seed rack in which the seed holder of FIGS. 3–5 may be mounted and for convenience of illustration shows one such seed holder in position.
Figure 10:
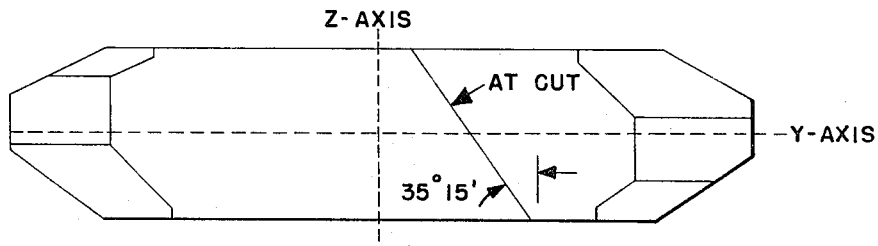
FIG. 10 is a top plan view of a cultured quartz crystal especially suitable for utilization in the production of AT cuts, as shown.
Figure 11:
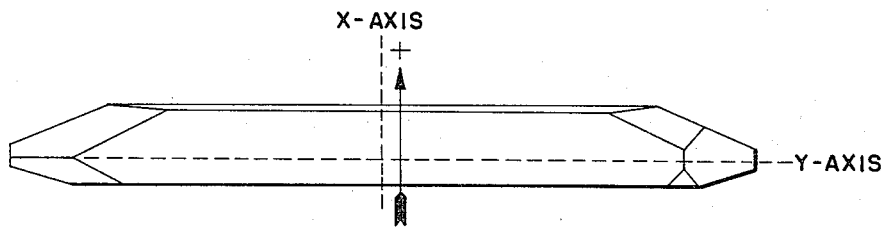
FIG. 11 is a side elevation of the crystal bar of FIG. 10.

A family of such seed holders as shown in FIGS. 3–5 is simultaneously planted in the seed-growing region 12 of the chamber 10, and for this purpose the rack 16 of FIG. 6 is used. The rack includes four corner steel posts 40, the lower ends of which may rest on the rim of the baffle plate 13, to which vertically spaced plates 41 are suitably secured. The plates 41, which may form as many tiers as permitted by the size of the chamber 10 and the length of the seed holders, support the triangular ends 38 of the seed holder, or the ends of the seed crystals may be similarly directly supported. In order to provide for the circulation of a nutrient solution around and between the seed holders, each plate 41 has spaced bar members 42, and each bar member has chamfers or recesses 43 which are vertically aligned with other chamfers on the facing side of an adjacent plate 41. The chamfers 43 thus readily receive the pointed ends 38 of a seed holder to position the seed crystals 33 vertically of the chamber 10. The bar members 42 of each plate are arranged to support the holders so as to dispose them in a substantially circular cross-sectional pattern as illustrated in FIG. 7, since the chamber 10 likewise is of circular cross-section. Accordingly, the rack 16 disposes the maximum number of seed holders in a cylindrical space and provides a very close packing of grown crystals. Although as mentioned, the ends of the seed may be directly supported, the pointed end construction of the seed holders, with one plate thereof terminating short of the pointed end as illustrated in FIGS. 3 and 4, affords a minimum restriction to the circulation of the nutrient solution. Also by this arrangement, the growth of the seed crystal is in a transverse direction of the vertical chamber 10, and this likewise affords maximum nutrient circulation in a general longitudinal direction of the chamber, even at the end of a run when the crystals are fully grown. The tension bands 39c of FIG. 7 are U-shaped, the legs thereof being normally disposed somewhat inwardly. Accordingly, upon being slipped over the plates 35 and 36, the bands 39c are tensioned to hold the plates and seed crystal 33 in assembly.

It will be apparent that the use of the present method and apparatus is not critical to any particular set of operating conditions. However, the following data are submitted as exemplary of one autoclave and operating conditions therefor which may be used in carrying out the invention.

| | | |
|---|---|---|
| Inside diameter | inches | 8 |
| Volume | liters | 79 |
| Design pressure | p.s.i. | 10,000 |
| Design temperature | °C. | 400 |
| Steel | Croloy | 2¼ |
| Closure | | Modified Bridgeman |
| Manufacturing method | | Bored |
| Inside height | feet | 8 |
| Outside height | inches | 106⅝ |
| Outside diameter | do | 14 |

"Croloy" is a trade name for steel-containing chromium. By "Modified Bridgeman" is meant that conventional high pressure seal known in the art.

The operating conditions of a typical run for an autoclave of the type just described are:

| | |
|---|---|
| Solution | 0.5 to 0.83 molar sodium carbonate in water. |
| Degree of initial filling | 80% of autoclave capacity. |
| Operating temperature of seed-growing region | 350° C. |
| Operating temperature of mineral-dissolving region | 365° C. |
| Pressure | 11,000 p.s.i. |
| Number of seeds | 180 to 200 (depending on lengths). |
| Length of run (including clean out and restart) | 40 to 45 days. |

A normal procedure is to load the autoclave through the opening of the plug 20 and after sealing to commence heating the autoclave. When the temperature of the autoclave reaches about 150° C. as indicated by thermocouples, the air within the autoclave is bled through the bleeder valve 23. Heating is then continued through the heater strips 27 and 28 until a control point is reached which is normally about 365° C. for the mineral-dissolving region 11. Subsequently, the temperature is maintained at the control point as by standard automatic electrical equipment. At the operating elevated temperature and pressure, the aqueous sodium carbonate solution dissolves some of the quartz crystal material in the basket 14 of the mineral-dissolving region 11. Due to the temperature differential between the seed-growing region and the mineral-dissolving region, there are upward thermal currents of solution into the seed-growing region 12. Here the solution is cooled and becomes super-saturated with respect to the dissolved quartz crystals, again because of the difference in temperature, and deposits the quartz on the seed crystals. As these crystals grow, the accumulated growth takes place almost entirely along the preferred Z axis direction with the attendant previously described advantages. Growth in the direction of the X axis is effectively prevented by the plates 35 and 36 which are held against the edges 37 of the crystals 33 by the bands 39 or 39c. Growth in the direction of the Y axis (at the ends of the seed) is negligible. In view of this, it is now possible to take gamma ray photographs to measure quantitatively the progress of the growing crystals, since potential growth along the X axis can be disregarded.

The use of gamma rays and the like is the only known practical tool by which the crystal size can be measured non-destructively during crystal growth. Preferably, measurements are obtained by taking a gammagraph shadow picture of an "alley" between two vertical rows of crystals growing in the autoclave much in the same manner as a standard conventional X-ray is made. As growth continues, the width of this "alley" becomes smaller, and the accuracy of the resulting crystal Z-dimension termination increases. For the purpose of taking a gammagraph, a 5 curie point gamma ray source (of cobalt-60) is carefully arranged in relation to the seed rack 16 to project a beam between the adjacent vertical rows of seeds and impinge upon a plate which is then developed. This provides a close and quite satisfactory control as to size. However, the utility of gamma rays is not limited to photography. It is possible to use a variety of other detection or scanning devices, such as a Geiger counter.

At the same time it will be noted that a substantially constant area of each seed crystal is exposed to the nutrient solution, so that there is substantially uniform growth of all seed crystals. Additionally as the seeds grow in size, no portion of the seed holded and particularly the plates 35 and 36 are caught or otherwise embedded in the growing crystal, and accordingly no section of the finally grown crystal must be machined away in order to provide a crystal having plane sides. Simultaneously, the plates 35 and 36 prevent growth in the direction of the X axis. Still further, the seed crystals are grown transversely of the autoclave and thereby afford an economical use of the capacity of the autoclave while not unduly interfering with the circulation of the nutrient solution among the seed holders. The shape and particularly the pointed ends of the seed holders and construction of the rack contribute as well to an acceptable circulation of the nutrient solution even after the family of seed crystals is fully grown.

When the seeds are grown to the desired size, as indicated, for example, by gammagraph measurements, the power is turned off. The autoclave is permitted to cool and then may be opened for removal of the grown crystals.

The AT, NT, etc., cuts referred to are, of course, well known in the art, and reference may be had, for example, to "I. R. E. Standards and Piezoelectric Crystals," published in Proceedings of I. R. E., volume 37, December 1949. These same standards were adopted by ASA in 1951, of cf. ASA Standards C16.17.

It will be seen from the foregoing that the objects of this invention have been accomplished through employment of a true sheet seed of proper dimensions and orientation, preferably so mounted in the autoclave as to restrict growth in certain predetermined directions. Such restriction serves to limit undesired lower quality growth as well as facilitating maximum output of the autoclave. The ratio of the length of the seed crystal on the Y axis to the width on the X axis may be 3 to 1, especially if a seed of considerable length on the Y axis is available, but such ratio usually is preferably at least 6 to 1. The ratio of the width of the seed crystal on the X axis to the thickness on the Z axis is preferably at least 5 to 1.

When growing quartz crystals for use in making AT and closely related cuts, the major face of the seed will preferably intersect the crystallographic Z axis at an angle of $90° \pm 3°$; when growing quartz crystals for use in making 5° X cuts, the major face of the seed will preferably intersect the Z axis at an angle of $95° \pm 2°$; and when growing quartz crystals for use in making NT cuts the major face of the seed will preferably intersect the Z axis at an angle of $98\frac{1}{2}° \pm 1\frac{1}{2}°$. Maximum Z growth may further desirably be obtained by mechanically preventing growth on the plus X and/or minus X side of the quartz crystal seed. In some cases it is desirable thus to prevent growth on only one such side of the seed while not doing so on the other, depending on the size and shape of the crystal ultimately desired and the importance of avoiding incorporation of impurities.

Other modes of applying the principle of the invention may be employed, change being made as regards the details described, provided the features stated in any of the following claims or the equivalent of such be employed.

I therefore particularly point out and distinctly claim as my invention:

1. A method of uniformly growing a family of quartz crystals of increased usable bulk size and with a minimum of impurities in an autoclave having a seed-growing region, comprising the steps of positioning in such region at least two vertical rows of superimposed spaced-apart flat sheets of quartz seed crystals, each of said seed crystals having a major face intersecting the crystallographic Z axis at an angle of $90° \pm 10°$ and being dimensioned in the direction of the X and Z axes to produce a ratio of the lengths of the X to Z axes of at least 5, each of said seed crystals further having its major face substantially parallel to the other seed crystals of both rows, exposing the seed crystals to a chemical and physical environment to cause crystal growth preferentially on such major faces, directing gamma rays between said rows of crystals and thorugh said autoclave, taking a gammagraph shadow picture of the rays exiting from the autoclave to determine the distance between said vertical rows, and interrupting the exposure and resultant growth of the crystals when such distance reaches a predetermined minimum.

2. A method of growing in a substantially vertically extending autoclave having a seed-growing region a family of substantially uniform quartz crystals from seeds thereof, each seed having a major surface in a plane substantially parallel to that defined by the X and Y axes of the seed crystal, said method comprising the steps of superimposing a plurality of said seed crystals in the seed-growing region and in spaced-apart vertical rows with the major surfaces of crystals being substantially parallel to each other and to the vertical extent of the autoclave, the distance between the rows paralleling the direction of the Z axis of such seed crystals, restricting growth of the seed crystals in a direction along their X axes, passing a nutrient solution having dissolved siliceous material through the seed-growing region, depositing such siliceous material from the solution onto a substantially constant area of each seed crystal defined by such major surface, whereby each crystal grows at substantially the same rate in a direction away from a major surface thereof and transversely of the vertical autoclave, projecting gamma rays from one side of the autoclave between said vertical rows of crystals and impinging the rays against a sensitized plate on an opposite side of the autoclave, developing the plate to determine the width of the alley defined between and by said vertical rows, and then regulating the duration of the growth period based upon and in response to the decrease in size of said alley.

3. The method of controlling the growth of a family of pegmatitic crystals in a nutrient solution in a longitudinally extending autoclave having a seed-growing region to obtain maximum desired crystal size without the interference of one growing crystal with another, said method comprising the steps of positioning a plurality of sheet seed crystals in such seed-growing region and along at least one plane transversely disposed to the longitudinal extent of the autoclave, arranging at least two rows of said crystals in each plane in which major faces of the sheet crystals of each row are in substantial alignment and substantially parallel to major faces of the crystals of the other row, confining the growth on said sheet seed crystals to a direction substantially normal to said major faces, directing gamma rays through the autoclave in a path between the rows and substantially at right angles to the direction of crystal growth on said major faces, sensing the rays exiting from the autoclave to determine the space between said rows of growing crystals and therefore the extent of permissible crystal growth remaining, and interrupting the growth period when said space reaches a desired minimum.

4. The method of producing NT cuts of quartz crystal which comprises placing plate seed crystals in the crystal growing region of a crystal growing autoclave, such plate seed crystal having a minimum length of 4½ inches on the Y axis, a minimum thickness of 0.05 inch and a maximum thickness of 0.14 inch on the Z axis and a minimum width of ½ inch on the X axis, such plate seed having its surfaces of largest area substantially perpendicular to the crystallographic Z axis at an angle of $94° \pm 6°$, producing substantial crystal growth on such seeds, removing the grown crystals from the autoclave, and making NT cuts therefrom.

5. The method of claim 4, wherein growth on the X axis is mechanically restricted.

6. The method of growing quartz crystals of high quality and volumetric efficiency which comprises placing sheet seed crystals in the crystal growing region of a crystal growing autoclave, such sheet seed crystals having a length on the Y axis at least three times the width on the X axis, and having a width on the X axis at least five times the thickness on the Z axis, the major face of such Z-plate seed intersecting the crystallographic Z axis at an angle of $94° \pm 6°$, mechanically preventing growth on at least one X side of such seed, and producing substantial crystal growth on such seed.

7. The method of growing quartz crystals of high quality and volumetric efficiency which comprises placing Z-plate sheet seed crystals in the crystal growing region of a crystal growing autoclave, such sheet seed crystals having a length on the Y axis at least six times the width on the X axis, and having a width on the X axis at least five times the thickness on the Z axis, the major face of such Z-plate seed intersecting the crystallographic Z axis at an angle of 94°±6°, mechanically preventing growth on at least one X side of such seed, and producing substantial crystal growth on such seed.

8. The method of growing quartz crystals of high quality and volumetric efficiency which comprises placing Z-plate sheet seed crystals in the crystal growing region of a crystal growing autoclave, such sheet seed crystals having a minimum length of four and one-half inches on the Y axis, a minimum thickness of .05 inch and a maximum thickness of .14 inch on the Z axis, and a minimum width of one-half inch on the X axis, the major face of such Z-plate seed intersecting the crystallographic Z axis at an angle of 94°±6°, mechanically preventing growth on at least one X side of such seed, and producing substantial crystal growth on such seed.

9. The method of claim 8, wherein such length of seed on the Y axis is at least three times the width on the X axis.

References Cited by the Examiner
UNITED STATES PATENTS

| | | | |
|---|---|---|---|
| 2,558,745 | 7/1951 | Friedman et al. | 23—182 |
| 2,914,389 | 11/1959 | Charbonnet. | |
| 2,923,605 | 2/1960 | Jaffe et al. | 23—301 X |
| 2,923,606 | 2/1960 | Hale et al. | 23—301 X |
| 2,931,712 | 4/1960 | Turobinski | 23—301 X |
| 3,041,140 | 6/1962 | Alexander et al. | 23—182 |
| 3,101,259 | 8/1963 | Sawyer | 23—301 |

FOREIGN PATENTS

| | | |
|---|---|---|
| 757,857 | 9/1956 | Great Britain. |

OTHER REFERENCES

"I.R.E. Standards on Piezoelectric Crystals," from Proceedings of I.R.E., volume 37, page 1378, December 1949.

"Piezoelectric Crystals and Their Application to Ultrasonics," by Mason, D. Van Nostrand Co., Inc., 1950, page 83.

NORMAN YUDKOFF, *Primary Examiner.*

G. P. HINES, *Assistant Examiner.*